(12) United States Patent
Brown et al.

(10) Patent No.: US 10,367,689 B2
(45) Date of Patent: Jul. 30, 2019

(54) MONITORING INTERNET USAGE ON HOME NETWORKS OF PANELIST USERS

(71) Applicant: comScore, Inc., Reston, VA (US)

(72) Inventors: Michael A. Brown, Ashburn, VA (US); Yvonne Bigbee, Bristow, VA (US); Randall McCaskill, Vienna, VA (US)

(73) Assignee: comScore, Inc., Reston, VA (US)

( * ) Notice: Subject to any disclaimer, the term of this patent is extended or adjusted under 35 U.S.C. 154(b) by 240 days.

(21) Appl. No.: 14/523,582

(22) Filed: Oct. 24, 2014

(65) Prior Publication Data
US 2016/0119182 A1 Apr. 28, 2016

(51) Int. Cl.
*H04L 12/24* (2006.01)
*G06Q 10/06* (2012.01)
*H04W 88/16* (2009.01)

(52) U.S. Cl.
CPC ......... *H04L 41/082* (2013.01); *G06Q 10/063* (2013.01); *H04L 41/0856* (2013.01); *H04W 88/16* (2013.01)

(58) Field of Classification Search
CPC ... G06Q 10/063; H04W 88/16; H04L 41/082; H04L 43/0876
See application file for complete search history.

(56) References Cited

U.S. PATENT DOCUMENTS

| | | | |
|---|---|---|---|
| 5,594,900 A | 1/1997 | Cohn et al. | |
| 6,175,868 B1* | 1/2001 | Lavian | H04L 41/0816 709/223 |
| 8,195,478 B2* | 6/2012 | Petersen | G06Q 50/22 705/2 |
| 8,634,821 B2* | 1/2014 | Raleigh | H04L 41/0806 455/419 |
| 8,869,236 B1* | 10/2014 | Tonogai | H04L 63/08 709/224 |
| 9,197,600 B2* | 11/2015 | L'Heureux | H04L 63/02 |
| 9,462,041 B1* | 10/2016 | Hagins | H04L 67/10 |
| 9,577,923 B2* | 2/2017 | Rajkotia | H04L 45/30 |
| 10,116,535 B1* | 10/2018 | Brown | H04L 43/062 |
| 2003/0039212 A1* | 2/2003 | Lloyd | H04L 12/2602 370/235 |

(Continued)

OTHER PUBLICATIONS

International Search Report and Written Opinion in International Application No. PCT/US15/56602, dated Jan. 11, 2016, 8 pages.

*Primary Examiner* — Asad M Nawaz
*Assistant Examiner* — Kai Chang
(74) *Attorney, Agent, or Firm* — Baker & Hostetler LLP

(57) ABSTRACT

The present disclosure relates generally to monitoring internet usage on home networks of panelist users. One examples method includes after determining that a user has accepted an offer to modify a home network of the user to monitor network traffic generated by devices connected to the home network, identifying a gateway device on the home network configured to receive network traffic from devices connected to the home network and communicate with an external network on behalf of the devices; determining that the gateway device is operable to be modified over the home network to include a monitoring application; and in response to determining that the gateway device is operable to be modified, modifying the gateway device over the home network to include the monitoring application.

20 Claims, 4 Drawing Sheets

(56) References Cited

U.S. PATENT DOCUMENTS

| | | | |
|---|---|---|---|
| 2006/0205398 A1* | 9/2006 | Seckendorf | G06Q 10/063 |
| | | | 455/423 |
| 2006/0272014 A1 | 11/2006 | McRae et al. | |
| 2007/0111568 A1 | 5/2007 | Ferrari et al. | |
| 2008/0069111 A1 | 3/2008 | Sutton | |
| 2008/0320110 A1* | 12/2008 | Pathak | G06F 11/1433 |
| | | | 709/220 |
| 2009/0100492 A1* | 4/2009 | Hicks, III | H04L 12/2825 |
| | | | 725/127 |
| 2010/0261451 A1* | 10/2010 | Korhonen | H04L 63/0464 |
| | | | 455/410 |
| 2012/0210312 A1 | 8/2012 | Ma et al. | |
| 2012/0221955 A1* | 8/2012 | Raleigh | H04M 15/00 |
| | | | 715/736 |
| 2012/0259950 A1* | 10/2012 | Havekes | H04L 65/4084 |
| | | | 709/217 |
| 2014/0057620 A1* | 2/2014 | Lin | G06F 8/65 |
| | | | 455/418 |
| 2014/0122702 A1* | 5/2014 | Jung | H04L 43/0876 |
| | | | 709/224 |
| 2014/0140213 A1* | 5/2014 | Raleigh | H04L 41/0893 |
| | | | 370/235 |
| 2014/0269254 A1* | 9/2014 | Choorakkot Edakkunni | |
| | | | H04L 41/082 |
| | | | 370/218 |
| 2016/0198364 A1* | 7/2016 | Schwarzbauer | H04W 28/08 |
| | | | 370/331 |
| 2017/0104758 A1* | 4/2017 | Jin | H04W 12/06 |

* cited by examiner

MONITORING INTERNET USAGE ON HOME NETWORKS OF PANELIST USERS

BACKGROUND

Internet audience measurement may be useful for a number of reasons. For example, some organizations may want to be able to make claims about the size and growth of their audiences or technologies. Similarly, understanding consumer behavior, such as how consumers interact with a particular web site or group of web sites, may help organizations make decisions that improve their traffic flow or the objective of their site. In addition, understanding Internet audience visitation and habits may be useful in supporting advertising planning, buying, and selling.

SUMMARY

The present disclosure relates generally to monitoring internet usage on home networks of panelist users. One examples method includes after determining that a user has accepted an offer to modify a home network of the user to monitor network traffic generated by devices connected to the home network, identifying a gateway device on the home network configured to receive network traffic from devices connected to the home network and communicate with an external network on behalf of the devices; determining that the gateway device is operable to be modified over the home network to include a monitoring application; and in response to determining that the gateway device is operable to be modified, modifying the gateway device over the home network to include the monitoring application.

Implementations of any of the described techniques may include a method or process, an apparatus, a device, a machine, a system, or instructions stored on a computer-readable storage device. The details of particular implementations are set forth in the accompanying drawings and description below. Other features will be apparent from the following description, including the drawings, and the claims.

DETAILED DESCRIPTION

Figure 1:
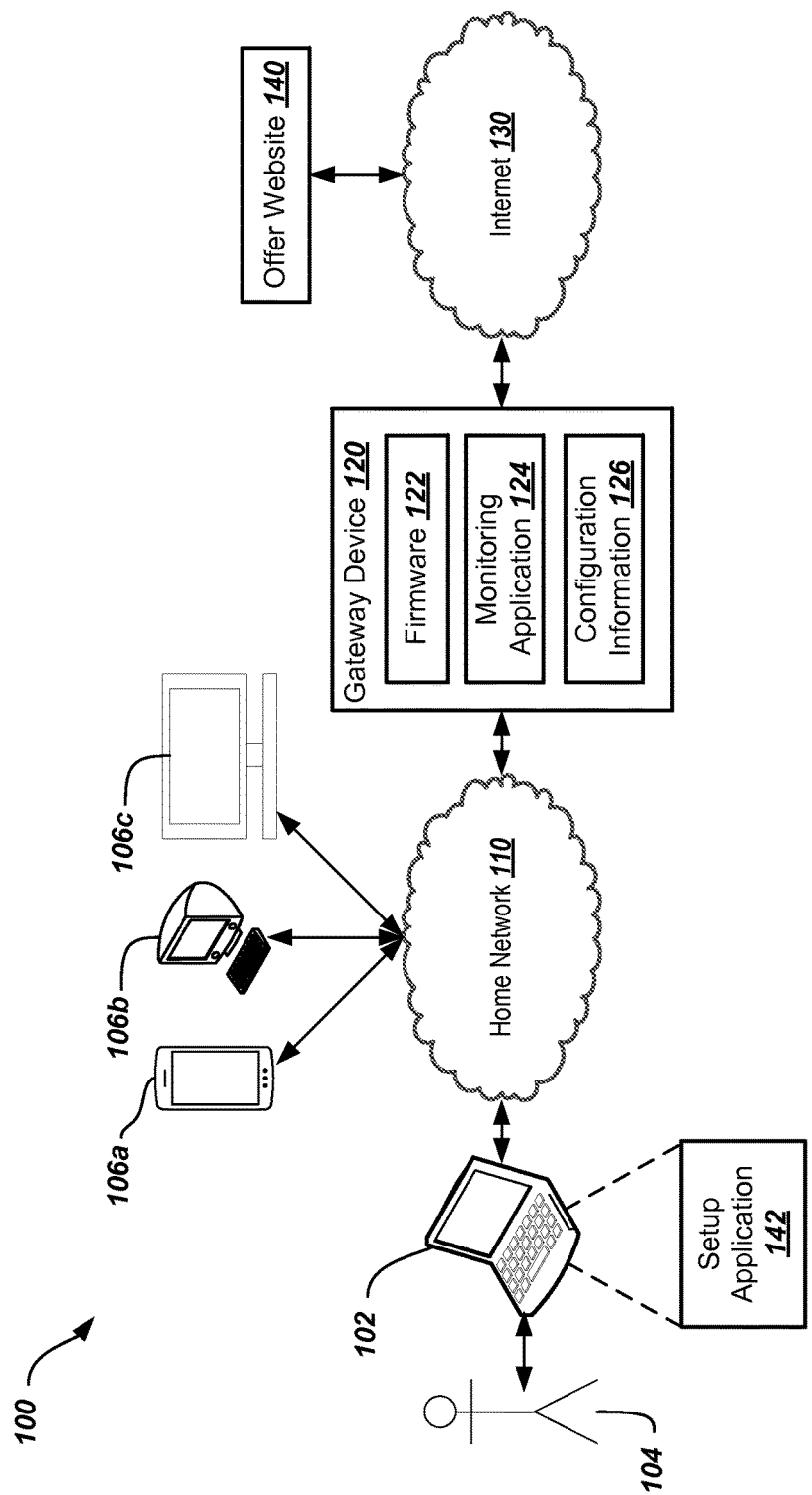
FIG. 1 illustrates an example of a system in which Internet traffic passing through a home network can be monitored by a monitoring application on a gateway device.

Internet usage data can be used by websites, advertisers, and others to determine characteristics and behaviors of the audience viewing their respective offerings. For example, an advertiser may use data relating to the age distribution of their audience to more specifically tailor a particular advertisement to appeal to a larger percentage of the audience. In some cases, these audience characteristics may be calculated by observing the Internet usage activity of a statistically significant number of users that are representative of the population as a whole. These "panelist" users may provide information about themselves, such as their age, income, sex, or other information, and may agree to have their Internet usage monitored. By observing the network usage of the panelists and determining characteristics and behaviors for them, characteristics and behaviors for the audience as a whole can be inferred (within a certain margin of error based on the size of the panel relative to the size of the audience as a whole). Panelists may agree to install a software application on a computing device they use to access the Internet. The software application may monitor the panelist's Internet usage from that particular computing device, such as by recording Hypertext Transfer Protocol (HTTP) requests sent by the device and HTTP responses received by the device in response to the requests.

In some cases, a panelist may have a private home network, such as a Wi-Fi network, with multiple computing devices connected to it in addition to the computing device on which the monitoring application is installed. For example, a panelist may install the monitoring application on a desktop computer on their home network, but may also use the Internet from other computing devices connected to the home network, such as, for example, smartphones, desktop computers, smart televisions, video-on-demand components, or other devices. Some of these computing devices, such as smart televisions, may not provide the panelist with the capability of installing a monitoring application at all. In addition, the panelist may upgrade their computing devices on a relatively short cycle (e.g., 18 months), necessitating a reinstall of the monitoring application each time a monitored computing device is upgraded.

Accordingly, the present disclosure describes techniques for monitoring internet usage on home networks of panelist users. One example method includes presenting an offer to a user to modify their home network to monitor network traffic generated by connected devices. If the user accepts the offer, a gateway device on the home network is identified that receives network traffic from devices connected to the home network and communicates with an external network on behalf of the devices. The gateway device is analyzed to determine if it can be modified over the home network to include a monitoring application. If the gateway device can be modified, the user is again prompted to determine if they wish to modify the gateway device. If the user consents, the gateway device is modified over the home network to include the monitoring application.

The present techniques may provide several advantages. By allowing a panelist to agree to monitoring of Internet usage one time for their entire home network by installing a monitoring application on their gateway device, fewer devices need to have custom software installed in order to perform such monitoring versus techniques in which each individual device needs to have a monitoring application installed. Further, as new devices are added to the home network, the monitoring application on the gateway device is automatically able to monitor their Internet activity with no required setup or configuration on the new devices. In addition, architectures of gateway devices are changing much more slowly than those of consumer devices, such as, for example, phones, which may release a new major operating system every few months. Such slow changing means that the monitoring application will not have to be updated as frequently as it would to keep up with the constantly changing consumer devices. The present techniques allow for monitoring of computing devices that may not allow installation of a monitoring application, such as smart televisions, allowing a wider range of Internet usage data to be monitored. Further, the present techniques may allow a consistent monitoring and analysis methodology to be applied to network activity from all devices on the monitored network.

FIG. 1 illustrates an example of a system 100 in which Internet traffic passing through a home network 110 of a user 104 can be monitored by a monitoring application 124 on a gateway device 120. The system 100 includes the home network 110, to which a number of computing devices are connected, including the user device 102 used by the user 104, and other devices 106a-c, which may include smart phones, desktop computers, smart televisions, and other devices. A gateway device 120 is connected to the home network 110 and to the Internet 130. In some cases, additional devices may be connected between the gateway device 120 and the Internet 130. For example, the gateway device 120 may be a wireless router providing a wireless network for use by the user device 102 and the other devices 106a-c. In such a case, the gateway device 120 may access the Internet 130 through another device that is connected to the Internet 130, such as a cable modem, another router, or other devices. An offer website 140 is connected to the Internet 130.

In operation, the user 104 uses the user device 102 to visit the offer website 140, which presents the user 104 with an offer to monitor network traffic on the home network 110. In some cases, this offer may be presented in the form of a webpage, and may indicate that acceptance of the offer will result in network traffic from the home network 110 to the Internet 130 being monitored. If the user accepts this offer, such as by clicking an "accept" button on the webpage, the offer website 140 may download and execute a setup application 142 on the user device 102. The setup application 142 may execute on the user device 102 and be operable to identify the gateway device 120, such as, for example, by analyzing a default gateway setting on the user device 102 indicating an address for the gateway device. The setup application 142 may interact with the gateway device 120 to determine whether the gateway device 120 is operable to be modified over the home network 110 to include the monitoring application 124. For example, the setup application 142 may retrieve an administration webpage from the gateway device 120, examine the administration webpage to determine a make and model associated with the gateway device 120, and determine whether the make and model associated with the gateway device 120 is included in the list of makes and models operable to be modified over the home network 110 to include the monitoring application 124. If the setup application 142 determines that the gateway device is operable to be modified, the setup application 142 may modify the gateway device 120 to include the monitoring application 124. The monitoring application 124 may be operable to capture network traffic from the user device 102 and the other devices 106a-c passing through the gateway device 120 to the Internet 130. In some cases, the monitoring application 124 may be operable to store this captured network traffic, and to periodically send the stored network traffic to an external server for further analysis.

The system 100 includes the home network 110. In some implementations, the home network 110 may be a wireless network generated by a network component, such as the gateway device 120. Such a wireless network may utilize any standard wireless networking technology, including 802.11a, 802.11b, 802.11g, 802.11n, Bluetooth, LTE, WiMAX, CDMA or any other wireless networking technology. In such implementations, the wireless network may be a public network in the sense that any device within range may connect to the network. Even though any device within range may connect to the home network 110 in such configurations, the device still may be required to authenticate in order to access resources on the home network 110 and/or on the Internet 130. The home network 110 may also be a wired network, such as an Ethernet network.

The system 100 also includes the user device 102 used by the user 104. In some cases, the user device 102 may be a computing device used by the user 104 to access resources connected to the Internet 130. The user device 102 may be any type of network enabled computing device, including, but not limited to, a laptop, a desktop, the smart phone, a tablet, a smart television, a video-on-demand component, a network enabled appliance (e.g., a refrigerator), or other computing device. In some implementations, the user device 102 may be a device on which the user 104 has previously agreed to install an application for monitoring network usage. In such a case, the previously installed application may direct the user device 102 to the offer website 140 so the user 104 can be presented with the offer to monitor network traffic on the home network 110. In some implementations, the user device 102 may execute web browser software operable to retrieve data from the Internet 130, such as the offer web page from the offer website 140, and present the data to the user 104 using an attached or external display device, such as a monitor. The user device 102 may also receive input from the user 104 via one or more input devices, such as a mouse or keyboard. The user 104 may indicate acceptance of the offer by clicking a button on the offer webpage using a mouse connected to the user device 102.

Other devices 106a-c are connected to the home network 110. The other devices 106a-c may be computing devices not currently being used by the user 104, but which may be being used by other users. As shown, the other devices 106a-c may include smart phones (106a), desktop computers (106b), smart televisions 106c, and may also include other types of computing devices connected to the home network 110. The other devices 106a-c may execute web browser software operable to retrieve data from the Internet 130, and may present the data to the user 104 using an attached or external display device, such as a monitor. The other devices 106a-c may also execute other software applications operable to retrieve data from the Internet 130, such as, for example, video streaming or downloading software, music streaming or downloading software, cloud storage client software, or other applications. The user device 102 may also receive input from the user 104 via one or more input devices, such as a mouse, a keyboard, a remote control, a touchscreen, or other devices.

The system 100 also includes the gateway device 120. In some cases, the gateway device 120 may be a network component operable to receive network traffic from the home network 110 and forward the traffic to the Internet 130. For example, the gateway device 120 may be a proxy server operable to receive HTTP requests from the home network 110, send the HTTP requests to the appropriate locations on the Internet 130, receive responses to the HTTP requests, and provide the received responses to the requesting device. In some implementations, the gateway device 120 may be a server or set of servers connected to the home network 110. The gateway device 120 may be a firewall or other network filtering component operable to examine network traffic from the home network 110 directed to the Internet 130, and selectively block some of the traffic based on configured rules. The gateway device 120 may also be a router operable to direct network traffic received from the home network 110 to destinations on the Internet 130 according to preconfigured rules. The gateway device 120 may also be a wireless router. In such a case, the home network 110 may be a Wi-Fi network created and managed by the gateway device 120, and the user device 102 and the other devices 106a-c may communicate data to and receive data from the gateway device 120 wirelessly. In some implementations, the gateway device 120 may be operable to broker secure requests to the Internet 130, such as those sent over Secure Socket Layer (SSL) connections. For example, the gateway device 120 may set up a first SSL connection with the user device 102 using its own SSL certificate, and may set up a second SSL connection with a requested resource on the Internet 130 on behalf of the user device 102. In some cases, the gateway device 120 may be operable to monitor all or a portion of the network traffic on the home network 110 including different network protocols including, but not limited to, HTTP, File Transfer Protocol (FTP), Transmission Control Protocol (TCP), Universal Datagram Protocol (UDP), Internet Protocol (IP), or other protocols.

The gateway device 120 includes firmware 122. In some cases, the firmware 122 may include instructions executed by the gateway device 120 to control its operations, such as an operating system. The firmware 122 may also include other software applications executed by the gateway device 120 during operation, such as applications or modules for handling network traffic that are not part of the operating system. In some implementations, the firmware 122 may be preloaded on the gateway device 120 by the manufacturer, and the gateway device 120 may be operable to update the firmware 122 as new versions become available, such as, for example, by periodically checking a location on the Internet 130 to determine if a new version of the firmware 122 is available, and downloading and installing the new version if so. In some cases, the gateway device 120 may allow the user 104 to update the firmware 122 over the home network 110.

If installed, the gateway device 120 includes monitoring application 124. In operation, the monitoring application 124 executes on the gateway device 120 and monitors network traffic received by the gateway device 120, including requests received from the home network 110, and responses to the requests received from the Internet 130. In some cases, the monitoring application 124 may be integrated into the firmware 122, such as, for example, through modifications to an operating system to include monitoring functionality. The monitoring application 124 may also be a module within the firmware 122 configured to be notified of network traffic by the operating system. For example, the operating system may be modified to explicitly call the module including the monitoring application 124 when network traffic is received. In some cases, the monitoring application 124 may be a software application including instructions specified according to one or more programming languages including, but not limited to, C, C++, Java, Python, Perl, assembly language, or other programming languages.

The monitoring application 124 may also include an interpreter other environment configured to execute programming language instructions, such as a Java virtual machine or a Python interpreter.

The gateway device 120 includes configuration information 126 including information controlling operation of the gateway device 120. In some implementations, portions of the configuration information 126 may be specified or changed using an administration interface, such as a webpage. The configuration information 126 may include, but is not limited to, routing information, network traffic policies, wireless configuration settings such as a Service Set Identifier (SSID), channel settings, or network keys, or other types of information.

The offer website 140 is connected to the Internet 130, and is operable to provide an offer to monitor the home network 110 to the user device 102 for presentation to the user 104. In some implementations, the offer website 140 may be a server or set of servers connected to the Internet 130 and operable to provide an offer webpage including the offer. The offer website 140 may also be operable to download and execute the setup application 142 on the user device 102 with consent of the user 104. The offer website 140 may also be operable to communicate with a previously installed software application (such as a monitoring application) on the user device 102 to present the offer to the user 104, to perform the actions of the setup application 142 described below, or to perform other actions.

As previously described, the setup application 142 may be installed on the user device 102 in response to receiving the user's consent. In some cases, the setup application 142 may be a software application including instructions specified according to one or more programming languages including, but not limited to, C, C++, Java, Python, Perl, assembly language, or other programming languages. The monitoring application 124 may also include an interpreter other environment configured to execute programming language instructions, such as a Java virtual machine or a Python interpreter. The setup application 142 may also include data used to determine whether the gateway device 120 is operable to be modified to include the monitoring application 124, such as, for example, a list of supported makes and models, a list of capabilities necessary for supported devices, a list of devices on which the monitoring application 124 has been tested and is known to work, or other data. The setup application 142 may also retrieve this data from an external source, such as a server connected to the Internet 130.

The setup application 142 may identify the gateway device 120 based on network settings of the user device 102. For example, the setup application 142 may identify an IP address of the gateway device 120 by examining a "default gateway" setting on the user device 102. In some cases, the setup application 142 may query the user 104 for an address of the gateway device 120, or may present the user 104 with a list of possible gateway devices 120. In some cases, the setup application 142 may identify the gateway device 120 by observing the behavior of network traffic sent on the home network 110 to the Internet 130. For example, the setup application 142 may use a "trace route" application to determine the route packets from the home network 110 will take to reach a known address on the Internet, such as, for example, the offer website 140. The setup application 142 may determine an address for the gateway device 120 by identifying network components connected to the home network 110 that a packet traverses before reaching the Internet 130 from the output of the "trace route" application.

The setup application 142 may interact with the gateway device 120 to determine whether the gateway device is operable to be modified over the home network 110 to include the monitoring application 124. For example, the setup application 142 may send requests over the home network 110 to the gateway device 120, and may determine characteristics of the gateway device 120 by analyzing the responses to these requests. For example, the setup application 142 may send an HTTP request to the gateway device 120, and may examine headers or other data included in the received response to determine characteristics of the gateway device 120. In some cases, the characteristics may include a make and model for the gateway device 120, a current firmware revision, a set of capabilities associated with the gateway device 120, or other characteristics. The setup application 142 may also retrieve, analyze, or interact with an administration interface of the gateway device 120 to determine characteristics of the gateway device 120. For example, the setup application 142 may send a request to the gateway device 120 for an administration webpage. Setup application 142 may analyze or interact with the administration webpage to determine the make and model for the gateway device 120, such as, for example, by parsing device information included in the webpage. The setup application 142 may also determine capabilities associated with the gateway device 120, such as, for example, by analyzing the administration webpage to determine if it presents an option to upgrade the firmware 122 on the gateway device 120. The setup application 142 may determine that the gateway device 120 is operable to be modified to include the monitoring application 124 based on these determined characteristics. For example, the setup application 142 may determine that the identified make and model for the gateway device 120 (e.g., "ExampleTec 54G") are included in a list of makes and models known to be modifiable to include the monitoring application 124.

The setup application 142 may store a backup copy or image of the configuration information 126 prior to making changes to the gateway device 120. In some cases, the configuration information 126 may be downloaded from the gateway device 120 over the home network 110 and stored on the user device 102. The configuration information 126 may also be stored in another location external to the user device 102, such as a cloud storage system connected to the Internet 130. In some cases, the stored configuration information 126 may be added to the new firmware image to be loaded on the gateway device 120 (as described below).

The stored configuration information 126 may also be used to restore the configuration of the gateway device 120 after the gateway device 120 is modified to include the monitoring application 124. A backup copy of the firmware 122 may also be created and used to revert the gateway device 120 to its pre-modification state at the request of the user 104 or if abnormal behavior by the gateway device 120 is detected after it is modified to include the monitoring application 124. In some cases, the gateway device 120 may be reverted to a standard firmware version.

Once the user consents and the gateway device 120 is determined to be operable to be modified to include the monitoring application 124, setup application 142 may modify the gateway device 120 to include the monitoring application 124. For example, a setup application 142 may erase the existing firmware and configuration information on the gateway device 120, and update the gateway device 120 with the new version of firmware including or configured to execute the monitoring application 124 and including the previously stored configuration information 126. In some cases, the new version of the firmware may be included with the setup application 142, or may be downloaded from a server connected to the Internet 130. The setup application 142 may update the gateway device 120 by sending requests to it over the home network 110. For example, if the gateway device 120 allows users to update the firmware 122 through an administration interface, the setup application 142 may interact with the administration interface exactly as a user would to update the firmware 122 to a new version of firmware including or configured to execute the monitoring application 124. The updated firmware may also be modified prior to updating the gateway device to include the configuration information 126. In some cases, after updating the firmware, the setup application 142 may restore the configuration information 126 to the gateway device 120, such as by interacting with the administration interface, or by uploading the stored configuration information to the gateway device 120. By restoring the configuration information 126 for the gateway device 120, settings previously configured on the gateway device 120 may be preserved after the gateway device is updated to include the monitoring application 124.

Figure 2:
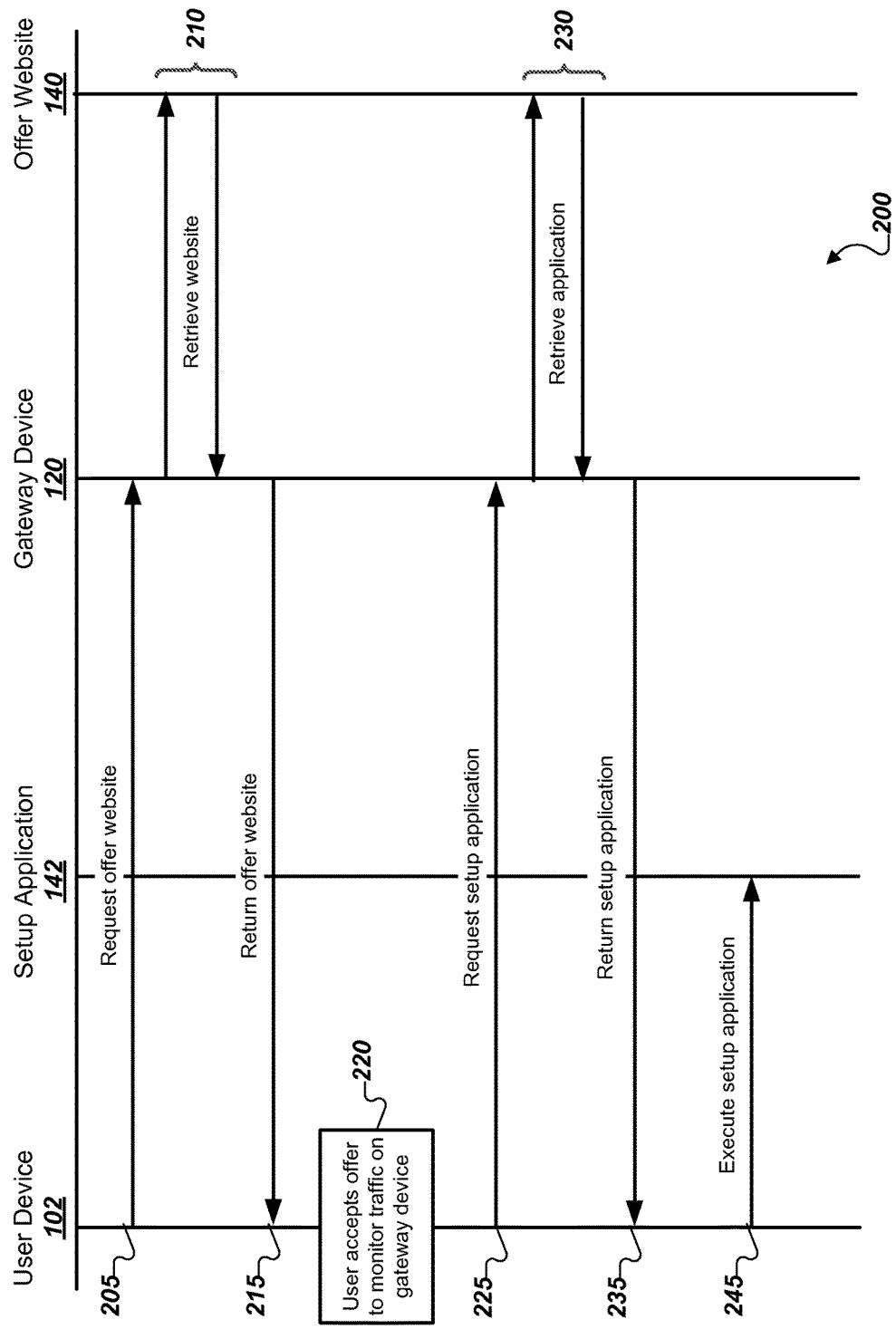
FIG. 2 illustrates an example of a sequence in which an offer to participate in a monitoring program is presented to a user.

FIG. 2 illustrates an example of a sequence 200 in which an offer to participate in a monitoring program is presented to a user of the user device 102. At 205, the user device 102 sends a request for the offer website 140 via the home network 110. The request is received by the gateway device 120, which retrieves the requested website from the offer website 140 (210). At 215, the gateway device 120 returns the retrieved offer website to the user device 102. The requests and responses shown at 205-215 may be made according to the HTTP protocol.

At 220, the user 104 of the user device 102 except the offer to monitor traffic presented by the offer website 140. As described previously, the offer may be presented in the form of a webpage displayed by web browser software executing on the user device 102, and may be accepted by the user 104 by clicking a button on or otherwise interacting with the webpage.

At 225, the user device 102, in response to the user 104 accepting the offer at 220, sends a request for the setup application 142, which is received by the gateway device 120. The gateway device 120 retrieves the setup application 142 from the offer website 140 at 230. At 235, the gateway device 120 returns the setup application 142 to the user device 102. At 245, the user device 102 executes the setup application 142.

Figure 3:
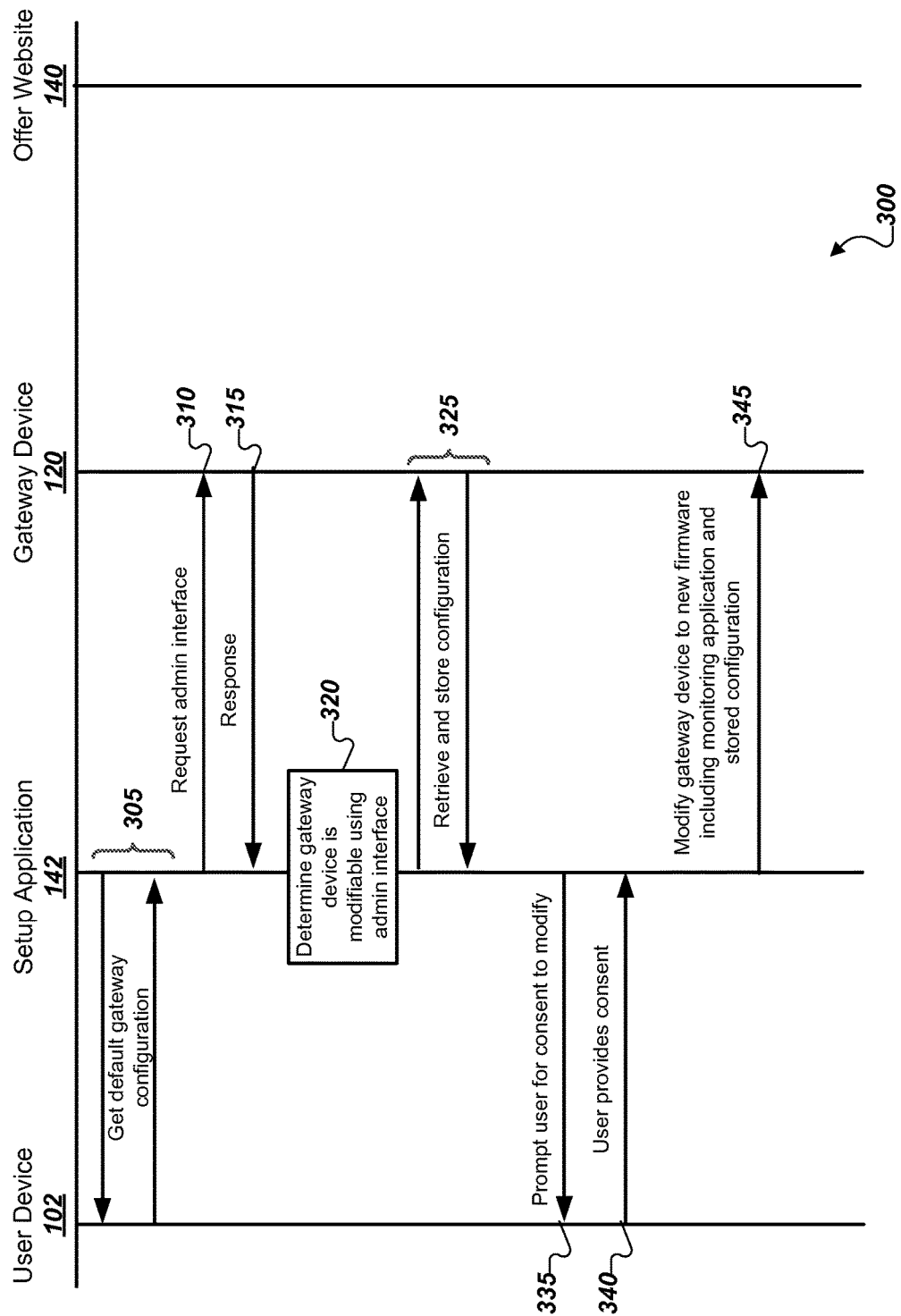
FIG. 3 illustrates an example of a sequence in which a gateway device is upgraded by a setup application.

FIG. 3 illustrates an example of a sequence in which the gateway device 120 is modified by the setup application 142. At 305, the setup application 142 retrieves the default gateway configuration of the user device 102 to identify the gateway device 120. In some cases, the setup application 142 may perform other actions to identify the gateway device 120, such as those described relative FIG. 1. At 310, the setup application 142 requests an administration interface from the gateway device 120. In some cases, the request is an HTTP GET request. At 315, the gateway device 120 sends a response to the request to the setup application 142. In some cases, the response is an HTTP 200 OK message including Hypertext Markup Language (HTML) data representing the administration interface.

At 320, the setup application 142 determines that the gateway device 120 is operable to be modified to include a monitoring application based on the admin interface received at 315. The setup application 142 may make this determination using the techniques described relative to FIG. 1, or using other techniques.

At 325, retrieves and stores configuration information from the gateway device 120. At 335, the setup application 142 prompts the user for consent to modify the gateway device 120 to include a monitoring application. In some implementations, the setup application 142 may prompt the user for consent by displaying a dialogue box including text asking for the user 104 to provide consent and buttons for the user 104 to activate to indicate their consent or lack of consent.

At 340, the user 104 provides consent. In response to the user come providing consent, the setup application 142 modifies the gateway device 120 to include new firmware including a monitoring application and the stored configuration from the gateway device 120 (345), as described relative to FIG. 1.

Figure 4:
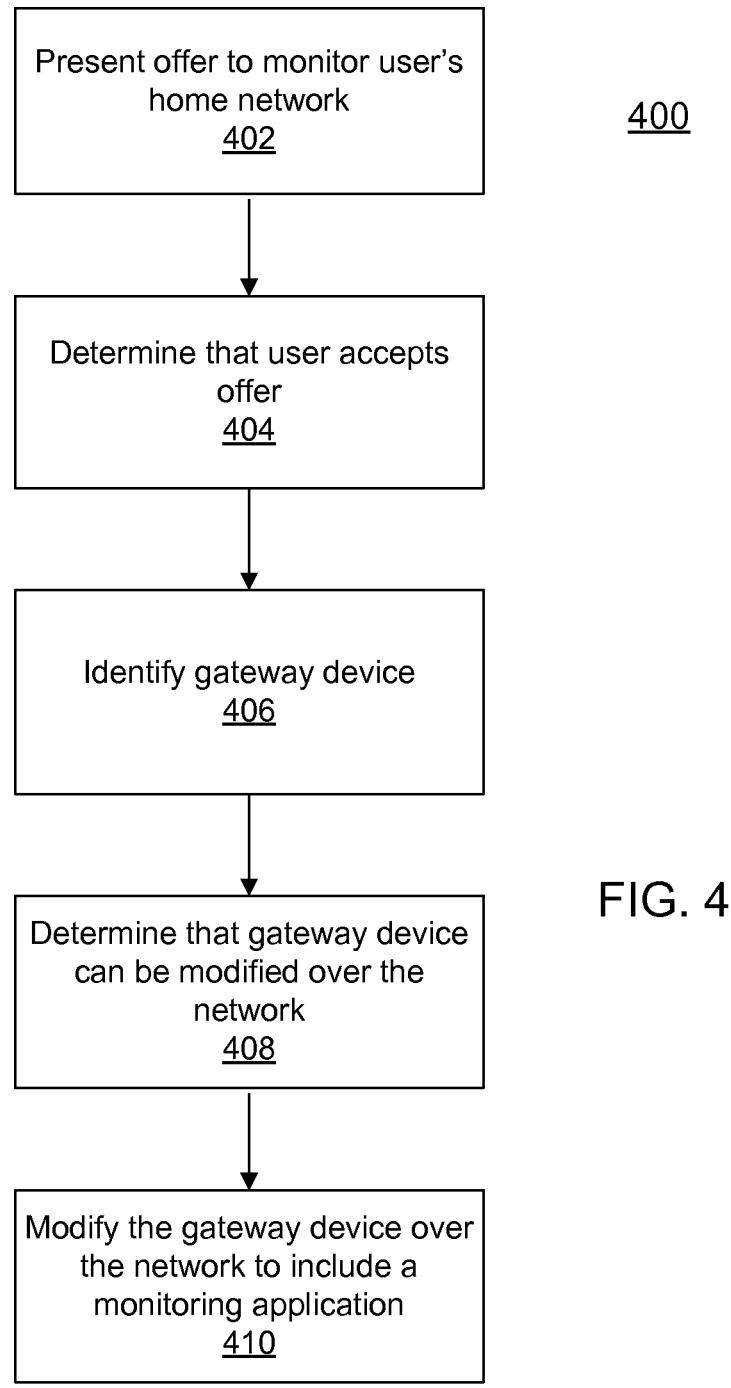
FIG. 4 is a flow chart illustrating an example of a process that may be performed to modify a gateway device to monitor network traffic in response to user acceptance of an offer to monitor the user's home network.

FIG. 4 is a flow chart illustrating an example of a process 400 that may be performed to modify a gateway device to monitor network traffic in response to user acceptance of an offer to monitor the user's home network. The following describes process 400 as being performed by the offer website 140, and the setup application 142. However, the process 400 may be performed by other systems or system configurations.

The offer website 140 presents an offer to a user to modify a home network of the user to monitor network traffic generated by devices connected to the home network (402). In some cases, the home network includes a wireless network. The offer website 140 determines that the user has accepted the offer to modify the home network (404).

The setup application 142 identifies a gateway device on the home network configured to receive network traffic from devices connected to the home network and to communicate with an external network on behalf of the devices (406). In some cases, identifying the gateway device on the home network includes identifying a default gateway configured on a device connected to the home network.

The setup application 142 determines that the gateway device is operable to be modified over the home network to include a monitoring application (408). In some implementations, determining that the gateway device is operable to be modified over the home network to include the monitoring application includes determining a device type associated with the gateway device, and determining that the device type is included in a set of device types operable to be modified to include the monitoring application. The device type may include a make and model associated with the gateway device, a set of capabilities associated with the gateway device, or other information. In some implementations, determining that the gateway device is operable to be modified over the home network to include the monitoring application includes determining that the set of capabilities associated with the gateway device indicates that the gateway device supports consumer-initiated firmware upgrades. In some cases, determining that the gateway device is operable to be modified over the home network to include the monitoring application includes sending one or more requests to the gateway device, and determining a make and model and a set of capabilities associated with the gateway device based on responses to the one or more requests.

In response to determining that the gateway device is operable to be modified, the setup application 142 modifies the gateway device over the home network to include the monitoring application (410). In some implementations, modifying the gateway device to include the monitoring application includes configuring an operating system of the gateway device to provide network traffic received by the gateway device from the home network to the monitoring application. Configuring the operating system of the gateway device may include loading new firmware on the device including the monitoring application and configured to provide network traffic received by the gateway device from the home network to the monitoring application. In some cases, modifying the gateway device to include the monitoring application includes identifying a modification mechanism supported by the gateway device based on the set of capabilities, and modifying the gateway device to include the monitoring application using the identified modification mechanism.

In some cases, before modifying the gateway device, the setup application 142 creates a copy of configuration information associated with the gateway device. In such a case, the setup application 142 or another application may modify the firmware to be loaded on the gateway device to include the configuration information. The configuration information may also be translated into a format associated with the firmware to be loaded on the gateway device. In some implementations, before modifying the gateway device, the setup application 142 may create a backup image of the gateway device, and store the backup image in a location external to the gateway device. The backup image may include configuration information for the gateway device.

In some cases, after modifying the gateway device, the setup application 142 may identify a request from the user to revert the gateway device; and in response to identifying the request to revert, may modify the gateway device to a previous state represented by the backup image. The setup application 142 may also modify the gateway device to the previous state represented by the backup image in response to a request from the user to revert the gateway device, or in response to determining that the modified gateway devices not operating correctly.

The setup application 142 may determine that the modified gateway device is not operating correctly by performing testing to determine the operational state of the gateway device, such as, for example, by sending requests from the home network to known addresses on the Internet through the gateway device in determining whether responses are received.

The techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device, in machine-readable storage medium, in a computer-readable storage device or, in computer-readable storage medium for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques can be performed by one or more programmable processors executing a computer program to perform functions of the techniques by operating on input data and generating output. Method steps can also be performed by, and apparatus of the techniques can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, such as, magnetic, magneto-optical disks, or optical disks. Information carriers suitable for embodying computer program instructions and data include all forms of non-volatile memory, including by way of example semiconductor memory devices, such as, EPROM, EEPROM, and flash memory devices; magnetic disks, such as, internal hard disks or removable disks; magneto-optical disks; and CD-ROM and DVD-ROM disks. The processor and the memory can be supplemented by, or incorporated in special purpose logic circuitry.

A number of implementations of the techniques have been described. Nevertheless, it will be understood that various modifications may be made. For example, useful results still could be achieved if steps of the disclosed techniques were performed in a different order and/or if components in the disclosed systems were combined in a different manner and/or replaced or supplemented by other components.

Accordingly, other implementations are within the scope of the following claims.

What is claimed is:

1. A computer-implemented method executed by one or more processors, the method comprising:
    receiving, from a device of a plurality of devices, input indicating acceptance of an offer to modify a home network to monitor network traffic generated by the plurality of devices connected to the home network;
    identifying, in response to receiving the input, a gateway device on the home network configured to receive network traffic from the plurality of devices connected to the home network and communicate with an external network on behalf of the devices, wherein the offer to modify the home network originates from a computing device other than the gateway device;
    sending, to the gateway device, a request to determine whether the gateway device is operable to be modified over the home network;
    receiving, from the gateway device, a response comprising an indication of one or more characteristics of the gateway device;
    determining, based on the one or more characteristics of the gateway device, that the gateway device is operable to be modified over the home network to include a monitoring application; and
    in response to determining that the gateway device is operable to be modified, downloading the monitoring application for execution by the gateway device to modify the gateway device,
    wherein the monitoring application of the modified gateway device enables the modified gateway device to transmit, to a server system outside the home network, data that indicates monitored Internet usage associated with the network traffic generated by the plurality of devices connected to the home network.

2. The method of claim 1, further comprising:
    before executing the monitoring application to modify the gateway device, creating a copy of configuration information associated with the gateway device, wherein downloading the monitoring application includes updating a firmware application on the gateway device to a new firmware application including the stored configuration information.

3. The method of claim 1, further comprising, before executing the monitoring application to modify the gateway device:
    creating a backup image of the gateway device; and
    storing the backup image in a location external to the gateway device.

4. The method of claim 3, wherein the backup image includes configuration information associated with the gateway device.

5. The method of claim 3, further comprising, after executing the monitoring application to modify the gateway device:
    identifying a request from the device to revert the gateway device; and
    in response to identifying the request to revert, modifying the gateway device to a previous state represented by the backup image.

6. The method of claim 5, wherein modifying the gateway device to the previous state represented by the backup image includes updating a firmware application on the gateway device to a default firmware application including the stored configuration information.

7. The method of claim 3, further comprising, after executing the monitoring application to modify the gateway device:
    determining that the modified gateway device is not operating correctly; and
    in response determining that the modified gateway device is not operating correctly, modifying the gateway device to a previous state represented by the backup image.

8. The method of claim 1, wherein downloading the monitoring application includes configuring an operating system of the gateway device to provide network traffic received by the gateway device from the home network to the monitoring application.

9. The method of claim 8, wherein configuring the operating system of the gateway device includes loading new firmware on the device including the monitoring application, which is configured to provide network traffic received by the gateway device from the home network to the monitoring application.

10. The method of claim 1, wherein determining that the gateway device is operable to be modified over the home network to include the monitoring application includes determining a device type associated with the gateway device, and determining that the device type is included in a set of device types operable to be modified to include the monitoring application.

11. The method of claim 10, wherein the device type includes a make and model associated with the gateway device.

12. The method of claim 10, wherein the device type includes a set of capabilities associated with the gateway device.

13. The method of claim 12, wherein determining that the gateway device is operable to be modified over the home network to include the monitoring application includes determining that the set of capabilities associated with the gateway device indicates that the gateway device supports consumer-initiated firmware upgrades.

14. The method of claim 12, wherein downloading the monitoring application includes identifying a modification mechanism supported by the gateway device based on the set of capabilities, and modifying the gateway device to include the monitoring application using the identified modification mechanism.

15. The method of claim 1, further comprising determining a make and model and a set of capabilities associated with the gateway device based on the response received from the gateway device.

16. The method of claim 1, wherein identifying the gateway device on the home network includes identifying a default gateway configured on a device connected to the home network.

17. The method of claim 1, wherein the home network includes a wireless network.

18. The method of claim 1, wherein the monitoring application is configured to send information about the network traffic generated by devices connected to the home network to a location external to the home network.

19. A non-transitory, computer-readable medium storing instructions operable when executed to cause at least one processor to perform operations comprising:
- receiving, from a device of a plurality of devices, input indicating acceptance of an offer to modify a home network to monitor network traffic generated by the plurality of devices connected to the home network;
- identifying, in response to receiving the input, a gateway device on the home network configured to receive network traffic from the plurality of devices connected to the home network and communicate with an external network on behalf of the devices, wherein the offer to modify the home network originates from a computing device other than the gateway device;
- sending, to the gateway device, a request to determine whether the gateway device is operable to be modified over the home network;
- receiving, from the gateway device, a response comprising an indication of one or more characteristics of the gateway device;
- determining, based on the one or more characteristics of the gateway device, that the gateway device is operable to be modified over the home network to include a monitoring application; and
- in response to determining that the gateway device is operable to be modified, downloading the monitoring application for execution by the gateway device to modify the gateway device, wherein the monitoring application of the modified gateway device enables the modified gateway device to transmit, to a server system outside the home network, data that indicates monitored Internet usage associated with the network traffic generated by the plurality of devices connected to the home network.

20. A system, comprising:
memory for storing data; and
one or more processors operable to perform operations comprising:
- receiving, from a device of a plurality of devices, input indicating acceptance of an offer to modify a home network to monitor network traffic generated by the plurality of devices connected to the home network;
- identifying, in response to receiving the input, a gateway device on the home network configured to receive network traffic from the plurality of devices connected to the home network and communicate with an external network on behalf of the devices, wherein the offer to modify the home network originates from a computing device other than the gateway device;
- sending, to the gateway device, a request to determine whether the gateway device is operable to be modified over the home network;
- receiving, from the gateway device, a response comprising an indication of one or more characteristics of the gateway device;
- determining, based on the one or more characteristics of the gateway device, that the gateway device is operable to be modified over the home network to include a monitoring application; and
- in response to determining that the gateway device is operable to be modified, downloading the monitoring application for execution by the gateway device to modify the gateway device,
wherein the monitoring application of the modified gateway device enables the modified gateway device to transmit, to a server system outside the home network, data that indicates monitored Internet usage associated with the network traffic generated by the plurality of devices connected to the home network.

* * * * *